United States Patent Office.

JACOB H. SMYSER, OF PITTSBURG, PENNSYLVANIA.

Letters Patent No. 113,588, dated April 11, 1871.

IMPROVEMENT IN ROOFING-COMPOSITIONS.

The Schedule referred to in these Letters Patent and making part of the same.

*To all whom it may concern:*

Be it known that I, JACOB H. SMYSER, of Pittsburg, in the county of Allegheny and State of Pennsylvania, have invented certain new and useful Improvements in a Fire and Water-Proof Composition for Roofing; and I do hereby declare the following to be a full, clear, and exact description of the same.

My invention or discovery relates to a new and useful method of utilizing waste vulcanized caoutchouc by adapting it to the purpose of a fire and water-proof roofing-composition.

I am aware that methods of using crude non-vulcanized caoutchouc have been often described for this purpose; but I am not aware that vulcanized India rubber has ever been so used; and my invention is independent of all such.

To make my composition, I fuse the vulcanized rubber, in a sufficiently-comminuted state, with the products of a destructive distillation, or slow putrefactive change of organic matters, such as coal-tar, pine-tar, bitumens, or asphaltums. After fusion I add a salt of an alkaline or an earthy metal, or a mixture or chemical combination of salts of the alkaline and earthy metals, equivalent (about) in weight to that of the fused mixture.

The proportions in which the two first-named ingredients are to be used depend entirely upon the product it is desired to obtain—that is, as regards cheapness and durability. I find that one part of vulcanized rubber to three parts of coal-tar, pine-tar, bitumen, or asphaltum, and this with three or four parts of the salts of the metals above-mentioned, answer a good purpose.

After thorough incorporation by heat the substance may be spread upon cloth, paper, or some such material, by means of brushes or suitable machinery, then sanded or dusted with iron-ore and rolled to any desired thickness.

I do not, of course, restrict myself to the above-named proportions—though they make a good product—as they may be changed or varied to suit the purpose in view.

Having thus fully described my invention,

What I claim, and desire to secure by Letters Patent, is—

A roofing-composition composed of vulcanized caoutchouc mixed or combined with the products of destructive distillation, or slow putrefactive change of organic matters, such as coal-tar, pine-tar, bitumen, or asphaltum, the resulting product being mixed with a salt of an alkaline metal, or salt of an earthy metal, or a mixture or chemical combination of salts of both.

JACOB H. SMYSER.

Witnesses:
SAML. PRESTLEY,
FRED. S. SWETT.